March 6, 1928.  1,661,449
J. D. TEW
METHOD AND APPARATUS FOR BUILDING PNEUMATIC TIRES
Filed April 9, 1923
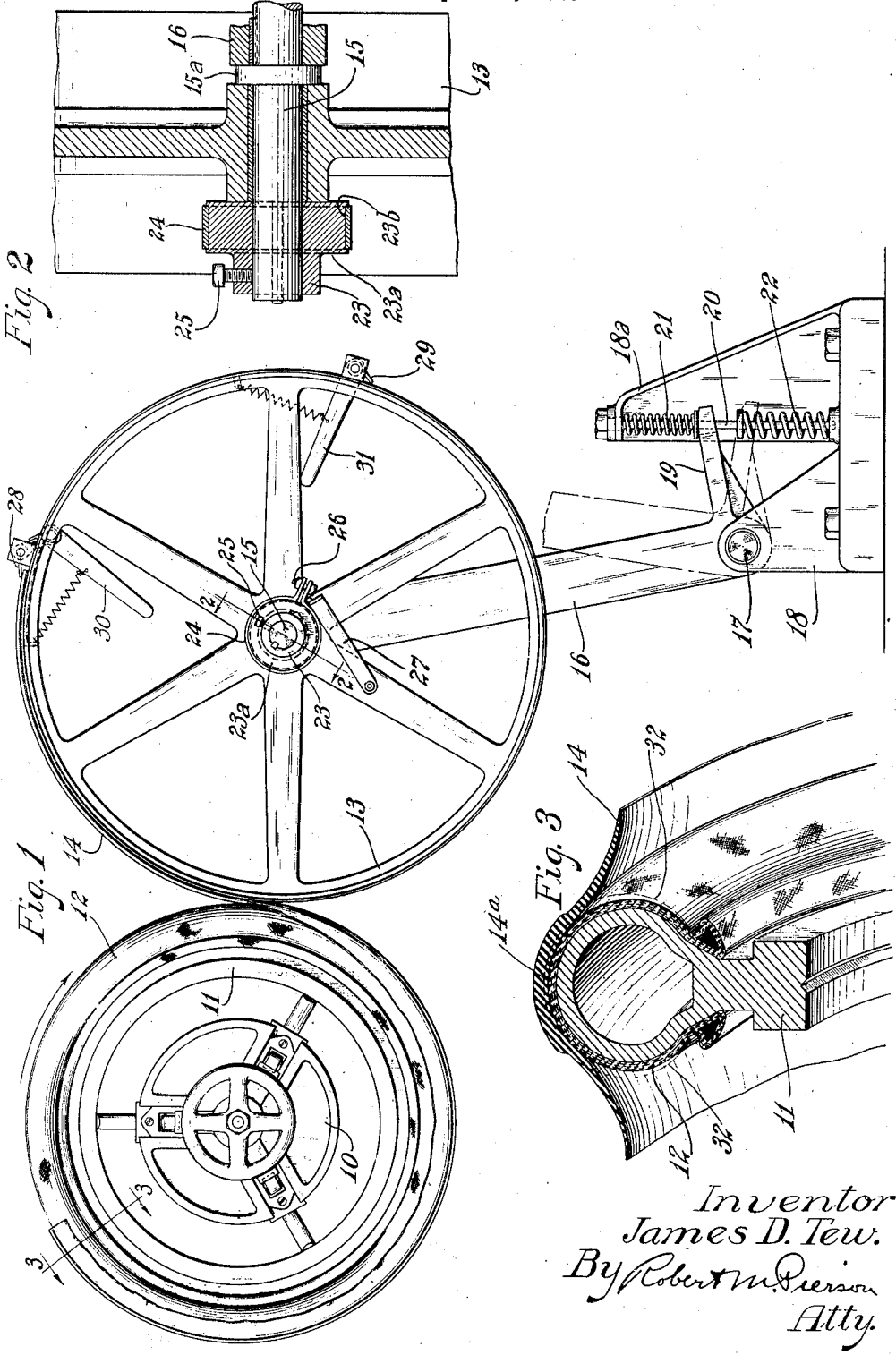
Inventor
James D. Tew.
By Robert M. Pierson
Atty.

Patented Mar. 6, 1928.

1,661,449

UNITED STATES PATENT OFFICE.

JAMES D. TEW, OF HUDSON, OHIO, ASSIGNOR TO THE B. F. GOODRICH COMPANY, OF NEW YORK, N. Y., A CORPORATION OF NEW YORK.

METHOD AND APPARATUS FOR BUILDING PNEUMATIC TIRES.

Application filed April 9, 1923. Serial No. 630,743.

This invention relates to the art of building pneumatic tire casings, and more particularly to the building of a tire in which the tread and side walls are formed as a unit or combined as a unitary strip before being incorporated in the tire and are thus presented to the tire carcass while the latter is mounted upon a tire building machine.

The chief obstacle to such procedure heretofore has been the folding or buckling of the lateral margins of the sidewall stock adjacent the tire beads, due to their excessive circumferential length compared with the space they are destined to occupy in the finished tire, the stock strip, as introduced to the rest of the work, being substantially flat in cross section and of a length corresponding to the outer circumference of the tire.

This invention is directed to overcoming this obstacle, its object being to provide an improved method and improved apparatus whereby the simultaneous application of tread and side walls is made practicable by preventing the formation of folds or wrinkles in the side walls as they are worked into place upon the tire carcass.

Of the accompanying drawings:

Fig. 1 is a view of apparatus embodying and adapted to carry out my invention, and the work thereon.

Fig. 2 is an enlarged sectional detail view on the line 2—2 of Fig. 1.

Fig. 3 is a perspective view, sectioned on the line 3—3 of Fig. 1, of the tire core and the work thereon.

Referring to the drawings, 10 is the rotatable, expansible chuck of a tire building machine (not shown) and 11 is a ring core carried thereby, a tire-carcass 12 being shown thereon. 13 is a rotatable drum adjacent and aligned with the tire core and supporting upon its periphery the tread and sidewall stock in the form of a unitary strip 14, which may be produced either by initially forming it integrally or by forming the tread and side-walls separately and then joining them in such unitary strip. The strip may include a longitudinally stretchable, bias-cut breaker-strip 14ª.

The drum 13 is journaled upon a horizontal, nonrotatable spindle 15 projecting laterally from the free, upper end of an overcenter rocker-arm 16, said rocker-arm having its lower end pivoted at 17 in a floor-bracket 18. The lower end of the rocker-arm 16 is formed with a projecting lever 19, the end of said lever being forked and straddling a vertical rod 20 secured at its respective ends in the floor-bracket 18 and in an upward extension 18ª thereon, said rod having mounted thereon helical compression springs 21, 22 positioned respectively above and below the forked end of said arm 19 and adapted to cushion the rocker-arm 16, either in its operative position shown in full lines in Fig. 1, or in its inoperative position shown in broken lines.

The spindle 15 is formed with a flange 15ª against which one face of the hub of the drum 13 abuts, and said hub is held upon said spindle by a collar 23 formed with an annular flange or brake-drum 23ª, said brake-drum having therein a peripheral groove 23ᵇ in which is clamped a brake-band 24. The collar 23 is keyed to the spindle 15 and secured against axial movement thereon by a set screw 25. The brake-band 24 has its end portions bent radially and parallel with each other, and a clamping bolt 26 joining said end portions is adapted for adjusting the tension of the band 24 upon the brake-drum 23ª. An arm 27 pivoted at one end to one of the spokes of the drum 13 has its free end angularly bent to engage the radial end portions of the brake-band 24, being thus adapted to drive said brake-band, upon the brake-drum 23ª, when the drum 13 is rotated.

Mounted upon the periphery of the drum 13 are spaced-apart clamps 28, 29, adapted to anchor the respective ends of the tread and side-wall strip 14 stretched upon the surface of said drum. The clamps 28, 29 are adapted to be lifted by respective hand-levers 30, 31, and each lever is provided with a pull spring adapted to keep said clamps normally in closed or clamping position as shown in Fig. 1.

In the practice of my improved method with the apparatus here shown the carcass 12 of the tire is built upon the ring core 11, in a known or suitable manner, and the tread and side-wall strip 14 is stretched, inverted, upon the periphery of the drum 13 and its respective ends anchored by the clamps 28, 29, said drum being at its inoperative position as indicated by the broken lines of Fig. 1. The drum is then thrown over center into contact with the rotating ring core, said contact first being made adjacent the clamp 29, the lever 31 of which is then manually actuated to raise said clamp and release the leading end of the tread and side wall strip 14, permitting said strip to be drawn onto and adhere to the tire carcass. Since the strip 14 is flat and the tire carcass 12 is arcuate in cross-section, it will be seen that if the drum 13 were allowed freely to rotate, the strip 14 would contact the carcass only along the median line of the latter's crown, but as the tread and side-wall strip 14 is drawn off the drum 13 by rotation of the core, said drum is braked by the brake-band 24, driven by the drum 13, upon its brake-drum 23ª, so as to impart a substantial stretch to the tread and side-wall strip, which stretch is greatest along the strip's line of contact with the tire casing, with the result that the strip is given a trough shape as it passes onto the carcass, the lateral margins of the strip being thrown inward toward the body of the tire carcass, as shown in full lines in Fig. 3, so that they may then be rolled or stitched into final position on said tire carcass, as indicated by the broken lines 32, 32 in Fig. 3, without excessive buckling of the material. As the strip 14, attached at its opposite ends to the tire-carcass 12 and the drum 13 respectively, has such frictional engagement with the two as to prevent an extended creeping of the strip thereon by elongation, the stretching of the strip is very closely localized at the nip of the core 11 and drum 13.

There is thus an avoidance of oblique lines of force running from the strip's middle portion at the nip to its margins at points remote from the nip, such as are present when the hold-back means is remote from the point of the strip's application to the tire. Elongation of the side margins of the strip, such as would require a great re-shortening thereof to avoid wrinkling, is thus avoided. The only lines of force running to the side margins of the strip are so nearly at right-angles to the length of the strip as to be ineffective to elongate said margins appreciably. The action may be the better appreciated by considering the fact that one longitudinal margin of a strip of elastic sheet material such as rubber may even be placed under longitudinal compression, so as to be caused to buckle, merely by stretching the opposite margin, when the points of engagement are sufficiently close together with relation to the width of the strip.

The stretching of the middle portion of the strip may be effected by a slight forward slipping of such portion upon the surface of the drum, closely localized at the point of application, or, and especially in the case of a thick strip of stock such as a tread slab, it may be effected by a forward distortion of the rubber which is next to the tire carcass, followed by a springing forward of the rubber on the drum side of the strip as such rubber emerges from the nip.

In my method as described the strip is progressively bent into longitudinally arcuate form concurrently with the lateral flexing thereof into trough shape, so that the side margins of the strip are given a less maximum stretch than the middle portion of the strip and do not require much re-shortening, notwithstanding the longitudinal stretching of the middle portion of the strip.

The tension of the brake may be so adjusted as to produce the effect described even though the drum 13 on its over center arm leans with substantial pressure against the work, but while I find such pressure of the tread strip against the carcass by the drum 13 to be of advantage in accurately positioning said strip upon the carcass and adhesively securing it in place, I do not wholly limit my invention to this specific feature.

My invention as herein described being subject to modification without departing from its scope, I do not wholly limit my claims to the specific construction or steps of procedure described.

I claim:

1. The method of building pneumatic tires which comprises feeding a strip of tire-building material onto a tire-core, the middle portion of the strip passing onto the crown of the core, while effecting a localized, progressive stretching of said middle zone by hold-back engagement with the outer face thereof substantially at the point of application, whereby said middle zone is more stretched than the side margins and the strip is thus caused progressively to assume a trough shape by lateral flexing, concurrently with its assuming a longitudinally arcuate form, in passing onto the core.

2. A method as defined in claim 1 in which the hold-back engagement is such as to compress the middle zone of the strip against the tire-core.

3. The method of building pneumatic tires which comprises forming a structure in which are combined the tread and side-wall strips, and feeding said strips onto a tire-carcass while effecting a localized, progressive stretching of the tread zone of said structure by hold-back engagement therewith substantially at the point of application and permitting the side-wall portions to pass onto the tire carcass with less maximum longitudinal stretch than that of the middle portion of the strip.

4. A method as defined in claim 3 in which the hold-back engagement is with the outer face of the strip and is such as to press the tread zone of the structure against the tire carcass.

5. Tire-building apparatus comprising a tire-core, means for rotatably supporting the same, a rotatable drum aligned with said tire-core and adapted to bear yieldingly against the work on said core, and means for retarding the rotation of said drum with relation to the rotation of said tire-core.

6. Tire-building apparatus comprising means for rotatably supporting a tire core, a tire core thereon, a rotatable drum aligned with said tire core and adapted to bear yieldingly against the work on said core, means on said drum for clamping the trailing end of a strip of tire-building material mounted thereon, and means for causing said drum to rotate at a slower peripheral speed than that of the work on said core as said strip is drawn onto the core by rotation of the latter.

In witness whereof I have hereunto set my hand this 4th day of April, 1923.

JAMES D. TEW.